United States Patent [19]

Bleidt et al.

[11] 4,414,451
[45] Nov. 8, 1983

[54] DISCONNECT SWITCH

[75] Inventors: Rolf Bleidt; Heinrich Neumaier, both of Hanau, Fed. Rep. of Germany

[73] Assignee: Brown, Boveri & Cie AG, Mannheim, Fed. Rep. of Germany

[21] Appl. No.: 171,344

[22] Filed: Jul. 23, 1980

[30] Foreign Application Priority Data

Jul. 25, 1979 [DE] Fed. Rep. of Germany ....... 2930075

[51] Int. Cl.³ ............................................ H01H 33/64
[52] U.S. Cl. ............................. 200/148 H; 200/148 R
[58] Field of Search ............ 200/148 H, 150 C, 148 R

[56] References Cited

U.S. PATENT DOCUMENTS 1,782,594 11/1930 Allan ................................ 200/150 C

FOREIGN PATENT DOCUMENTS 2818914 10/1979 Fed. Rep. of Germany ... 200/148 H

Primary Examiner—Robert S. Macon
Attorney, Agent, or Firm—Herbert L. Lerner; Laurence A. Greenberg

[57] ABSTRACT

Disconnect switch, including a bus bar, at least one phase feed conductor being connected to the bus bar and having at least one fixed bus bar contact, a safety switch or circuit breaker, at least one outgoing conductor connected to the safety switch or circuit breaker, a drive shaft, at least one contact blade rotatably drivable on the drive shaft into current-conducting connection with the at least one fixed bus bar contact in an on position, and at least one fixed blade contact being in continuous current-conducting connection between the at least one outgoing conductor and the at least one contact blade.

3 Claims, 5 Drawing Figures

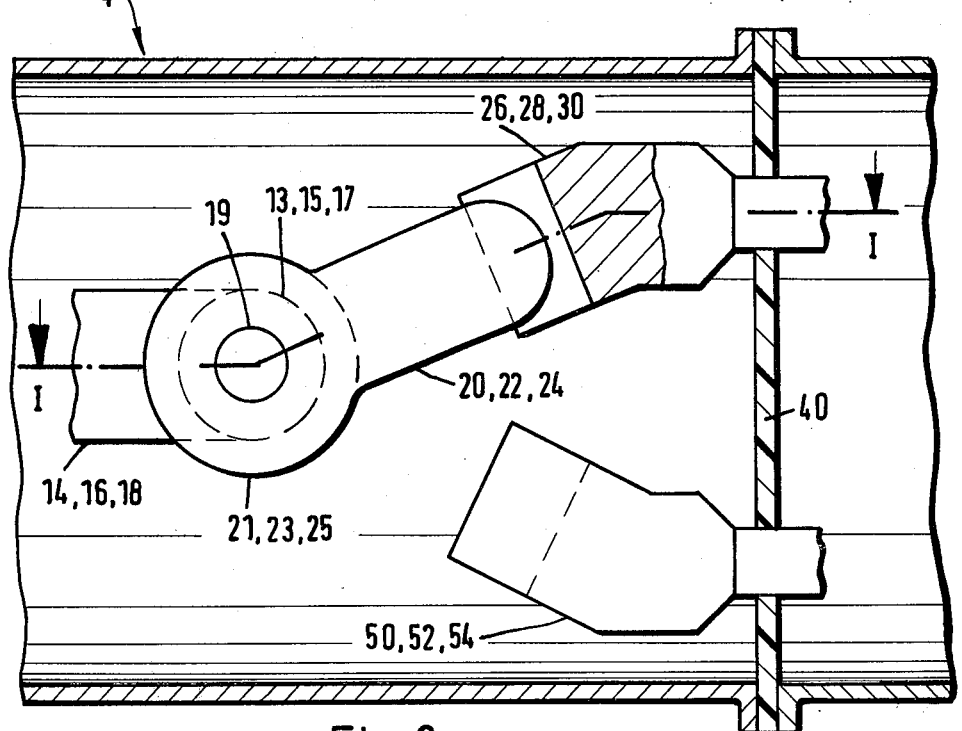
Fig. 2
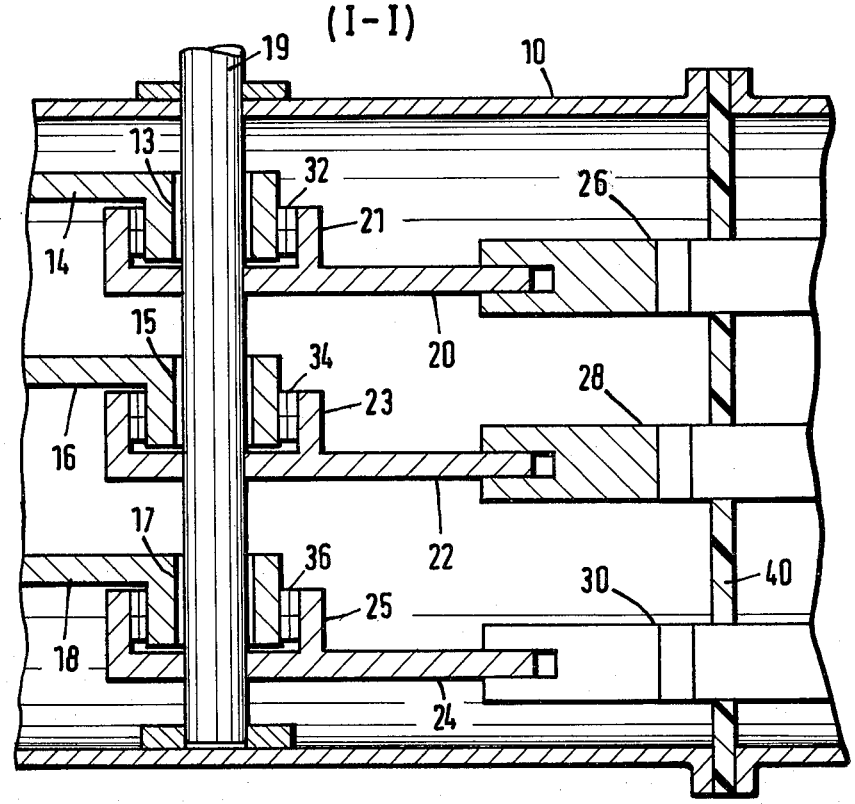
Fig. 3 (I-I)

(II-II)

DISCONNECT SWITCH

The invention relates to a disconnect switch, especially a metal-encapsulated $SF_6$ gas-insulated high-voltage disconnect switch with at least one contact blade rotationally driven by a drive shaft, that in the "on" position is connected to the fixed contact of the feed conductor coming from the bus bar in a current-conducting manner.

Customarily, such contact blades are constructed with two diametrically opposite contact arms which can be rotated together by the drive shaft. In the "on" condition, each contact arm is connected to the respective fixed contact of the phase conductor for the current feed on one side of the drive shaft and the outgoing current lead on the other side of the drive shaft. Each contact blade therefore makes two contact connections in a switching operation. Spatially, this construction also has the disadvantage that it requires more, i.e. twice the space of a contact blade with only one arm.

It is accordingly an object of the invention to provide a disconnect switch which overcomes the hereinaforementioned disadvantages of the heretofore-known devices of this general type, and to provide with simple means a contact blade of this type, which is of mechanically simpler construction and requires less space, and is also operationally simpler and therefore more reliable since also only one contact must be made or broken for a switching operation.

With the foregoing and other objects in view there is provided, in accordance with the invention, a disconnect switch, comprising a bus bar, at least one phase feed conductor being connected to the bus bar and having at least one fixed bus bar contact, a safety switch or circuit breaker, at least one outgoing conductor connected to the safety switch or circuit breaker, a drive shaft, at least one contact blade rotatably drivable on the drive shaft into current-conducting connection with the at least one fixed bus bar contact in an on position, and at least one fixed blade contact being in continuous current-conducting connection between the at least one outgoing conductor and the at least one contact blade.

In accordance with another feature of the invention, there is provided a first bearing bushing integral with each of the at least one contact blade, and a second bearing bushing integral with each of the at least one outgoing conductor, the at least one fixed blade contact being in the form of a multi-contact bushing being supported coaxially on the drive shaft and making contact between the first and second bushings.

In accordance with a further feature of the invention, there is provided a bearing bushing integral with each of the at least one contact blade and the drive shaft alone.

The second contact arm of a contact blade is therefore eliminated by the continuous contact of the contact blade with the circuit breaker or safety switch by means of the multi-contact bushing. In addition, a substantial amount of space is saved, of course, by the elimination of one contact blade arm.

This simultaneously provides the possibility of adaptation to different possible connections of an installation with two bus bars accommodated in an encapsulation and with three phase conductors disposed in each bus bar. Therefore, in accordance with an added feature of the invention, there is provided another bus bar, each of the first-mentioned and other bar having three phase feed conductors and three fixed bus bar contacts, the at least one contact blade being three contact blades selectably connectible to the fixed bus bar contents of the first-mentioned and other bus bars.

In accordance with an additional feature of the invention, the at least one fixed bus bar contact is in the form of three fixed bus bar contacts, and the at least one phase feed conductor is in the form of three phase feed conductors disposed in a Y-shaped arrangement, and there is provided an L-shaped intermediate piece connected between each of the three phase feed conductors and one of the three fixed bus bar contacts. This measure also has become possible through the one-arm construction of the contact blades with multi-contact bushings according to the invention.

In accordance with a concomitant feature of the invention, there is provided for high voltage, a metal encapsulation filled with $SF_6$ gas, through which the at least one fixed bus bar contact, outgoing conductor and drive shaft pass.

Other features which are considered as characteristic for the invention are set forth in the appended claims.

Although the invention is illustrated and described herein as embodied in a disconnect switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is an enlarged fragmentary cross-sectional view of the disconnect switch 4 shown in FIG. 1, partly broken away;

FIG. 3 is a cross-sectional view taken along the line I—I in FIG. 2, in the direction of the arrows;

Figure 1:
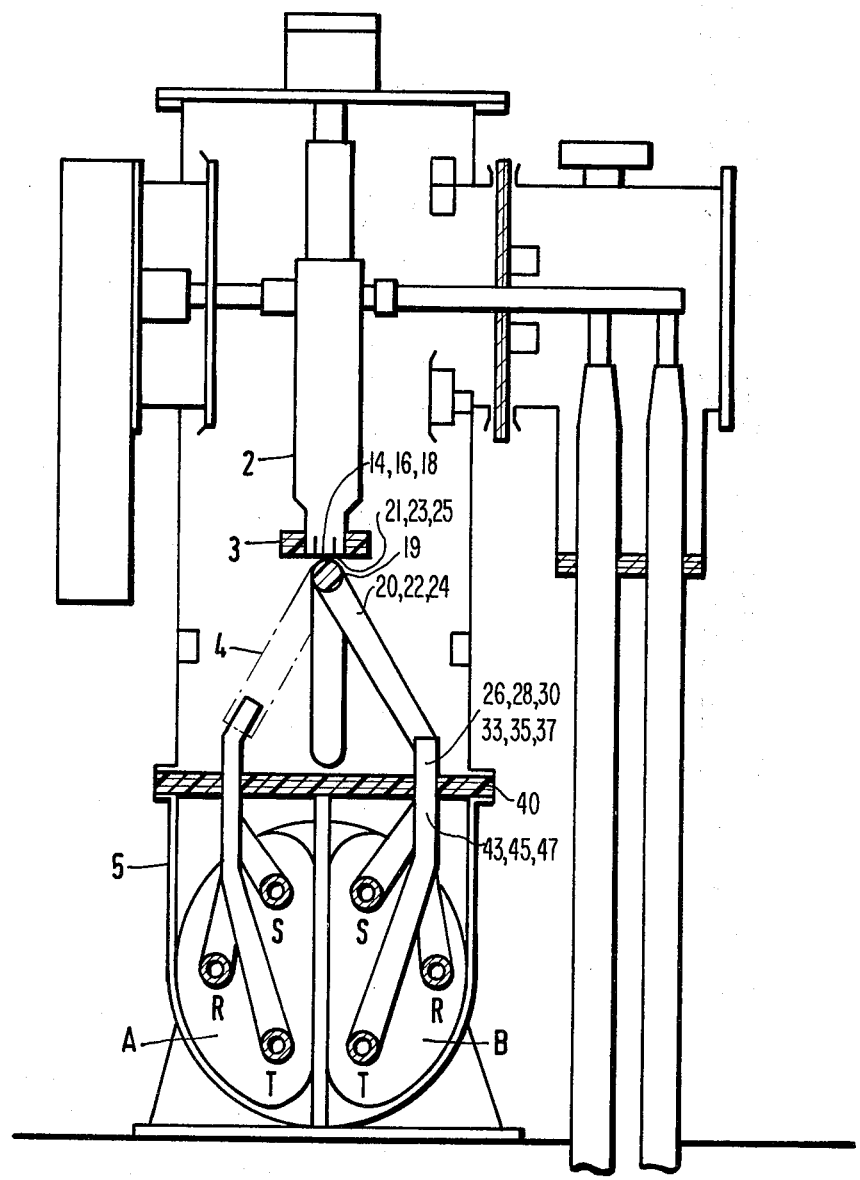
FIG. 1 is a diagrammatic fragmentary front elevational view, partly in section, of a switching installation with the disconnect switch according to the invention.

Referring now to the figures of the drawing and first particularly to FIG. 1 thereof, there is seen a switching installation including a circuit breaker or safety switch 2 fastened in a partition 3. A disconnect switch 4, which is shown in phantom and will be more fully described hereinbelow, connects the circuit breaker 2 to conductors R,S,T in bus bar A or conductors R,S,T in bus bar B. The bus bars A,B are fastened to another partition by a housing 5. The other parts of the installation which are not labeled are not the subject of the invention and will not be discussed in detail.

A first embodiment of the disconnect switch which is generally designated with reference numeral 4 in FIG. 1 is shown in enlarged size in FIGS. 2 and 3.

Figure 4:
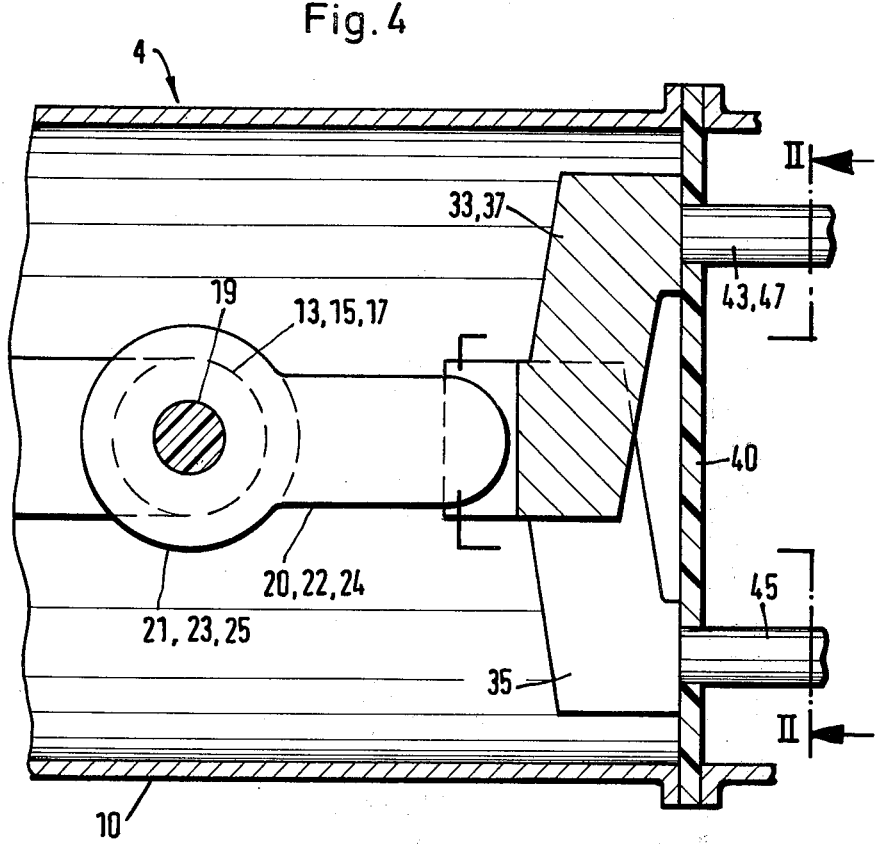
FIG. 4 is a view similar to FIG. 2, showing another embodiment of the disconnect switch.

The disconnect switch 4 includes a housing 10, an insulating drive shaft 19, on which three contact blades 20, 22, 24 are rotatably mounted by means of each having a bearing bushing 21, 23, 25, respectively. Multi-contact bushings 32, 34, 36 which in turn are supported on bearing bushings 13, 15, 17 serve as bearings. The bearing bushings 13, 15, 17 are in connection with the circuit breaker or safety switch 2 of the installation shown in FIG. 1, through outgoing lines 14, 16, 18. The contact blades 20, 22, 24 are positively connected to the drive shaft 19 and are in continuous contact-making connection with the circuit breaker 2 through the multi-contact bushings 32, 34, 36 and the outgoing lines 14, 16, 18. Depending on the connection, the contact blades 20, 22, 24 can be brought into contact with the contacts 26, 28, 30 of the three phase conductors R,S,T of the bus bar B that pass through the partition 40, as shown in FIGS. 1, 2 and 4, or with the contacts 50, 52,54 of the three-phase conductors R, S, T of the bus bar A that also pass through the wall 40, as shown in FIGS. 1 and 2.

Figure 5:
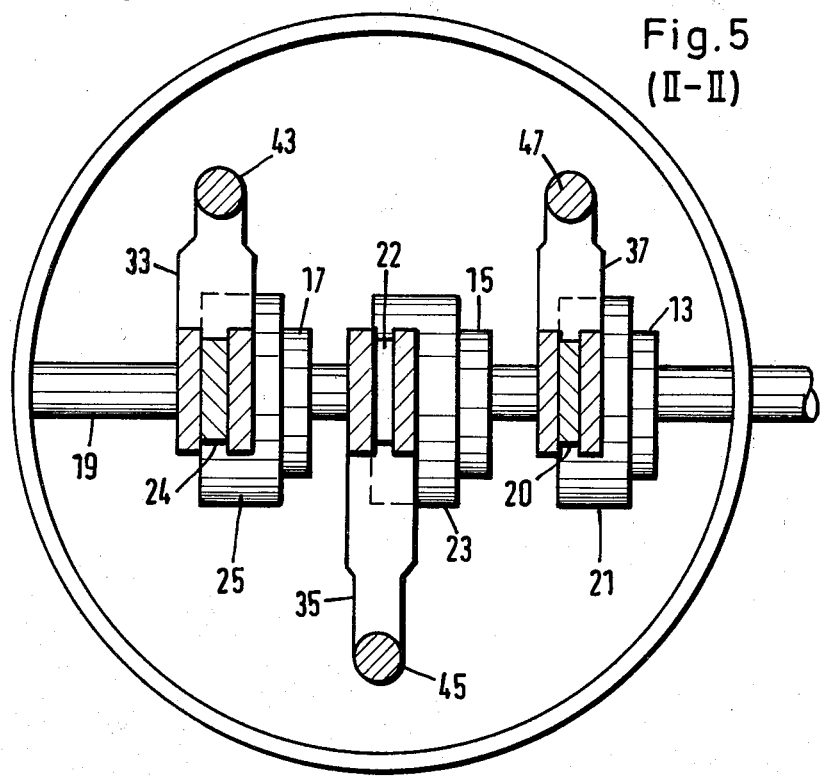
FIG. 5 is a cross-sectional view taken along the line II—II in FIG. 4, in the direction of the arrows.

Reference will now be made to the embodiment of FIGS. 4 and 5 with the aid of FIG. 1, wherein like parts as in FIGS. 2 and 3 are given the same reference numerals. It is seen that if the three-phase conductors 43, 45, 47 of a bus bar system shown in FIG. 5 are disposed at corners of an imaginary triangle, the contacts 33, 35, 37 are Z-shaped in such a manner that the fork-shaped ends of the contacts 33, 35, 37 cooperating with the contact blades 20, 22, 24 lie in one plane as shown in FIGS. 4 and 5.

There are claimed:

1. Disconnect switch, comprising a metal housing, $SF_6$ insulating gas filling said housing, a three-phase bus bar disposed outside said housing, three phase-feed conductors each being connected to a respective one of said phases of said bus bar and each having a fixed bus bar contact leading into said housing, a safety switch disposed outside said housing, three outgoing conductors each being connected to said safety switch and leading into said housing, an insulated drive shaft leading into said housing, three contact blades disposed in said housing and each being rotatable on said drive shaft into current-conducting connection with a respective one of said fixed bus bar contacts in an on position, three first bearing bushings each being integral with a respective one of said contact blades, three second bearing bushings each being integral with a respective one of said outgoing conductors in said housing, and three multi-contact bushings each being supported coaxially on said drive shaft in said housing and each forming a continuous current-conducting connection between a respective first and second bearing bushing.

2. Disconnect switch according to claim 1, wherein said first bearing bushings are positively locked to said drive shaft.

3. Disconnect switch according to claim 1, wherein said phase-feed conductors are disposed at corners of an imaginary triangle and said bus bar contacts are Z-shaped.

* * * * *